Jan. 7, 1964 E. ANTOSZEWSKI 3,117,253
TEMPERATURE COMPENSATION OF TRANSISTOR AMPLIFIERS
Filed June 3, 1960
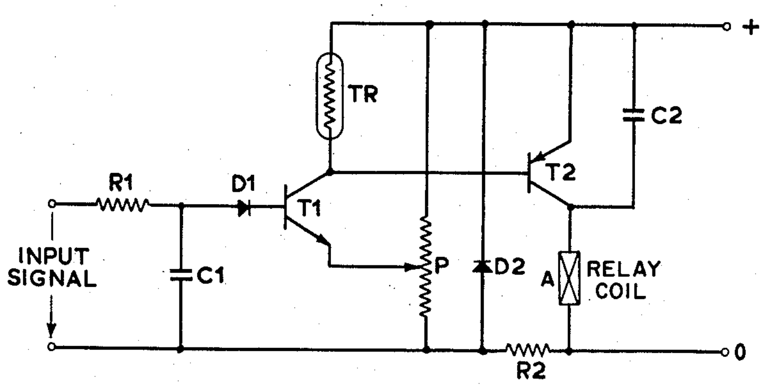
Inventor:
Eugeniusz Antoszewski
By
Stevens, Davis, Miller & Mosher
Attorneys

United States Patent Office 3,117,253

Patented Jan. 7, 1964

3,117,253

TEMPERATURE COMPENSATION OF TRANSISTOR AMPLIFIERS

Eugeniusz Antoszewski, Stafford, England, assignor to The English Electric Company Limited, London, England, a British company Filed June 3, 1960, Ser. No. 33,687
Claims priority, application Great Britain June 11, 1959
3 Claims. (Cl. 317—131)

This invention relates to electric amplifying apparatus incorporating transistors, and to the provision of means in such amplifying apparatus for compensating at least in part for variations in the characteristics of transistors with variations in their operating temperature.

According to the present invention an electric amplifying apparatus comprises first and second electric supply terminals for connection with a source of direct current, a first amplifying circuit which includes a first transistor of one conductivity type and having an emitter, a base and a collector, a resistor having a negative temperature coefficient of resistance, the resistor being connected in series relationship with and adjacent to the collector of the transistor, and an input circuit means connected with the base and emitter of the transistor for applying a voltage signal between the base and emitter, means for connecting the said first amplifying circuit for supply from the first and second supply terminals, the resistor being connected electrically adjacent the first supply terminal, a second amplifying circuit which includes a second transistor of the opposite conductivity type and having an emitter, a base and a collector, first and second output terminals for supplying an electric load device whereby the load device when connected to these terminals is connected electrically in series relationship with and adjacent to the collector of the second transistor, means for connecting the second amplifying circuit for supply from the first and second supply terminals, the emitter of the second transistor being connected electrically adjacent the first supply terminal, and means for applying across the base and emitter of the second transistor the voltage developed across the resistor, the resistor having a resistance-temperature characteristic such as to compensate for variations in the conduction of both of the transistors with variation in the temperature thereof.

According to another feature of the present invention the means for connecting the first amplifying circuit for supply from the supply terminals includes a voltage stabilising means connected for supply to the supply terminals and having an output circuit for supplying a voltage of substantially constant magnitude to the first amplifying circuit; and the input circuit means includes a biasing means and a driving means for applying between the emitter and base of the first transistor a biasing voltage and a driving voltage in opposition to one another, the emitter biasing means being connected for supply to the output circuit of the stabilising means and being arranged to supply to the emitter of the first transistor an adjustable biasing voltage whereby to control the magnitude of the base driving voltage at which an emitter-base current begins to flow, and the base driving circuit including an input circuit for supply from an input voltage signal source and comprising in series relationship a capacitor and a resistor, and circuit means for applying the voltage developed across the capacitor to the base of the first transistor.

Preferably a diode is connected adjacent the base of the first transistor so as to prevent the flow of collector-base current into the capacitor.

One time/over-current relay circuit arrangement incorporating an electric amplifying apparatus according to the present invention will now be described by way of example and with reference to the accompanying drawing. The drawing shows diagrammatically the electric circuit connections of the relay circuit arrangement.

Referring now to the drawing, the relay circuit arrangement includes a two stage transistor amplifier whose input stage is controlled by a drive potential derived from an input timing circuit, and whose output stage in response to changes in the input stage controls the flow of direct current in an operating coil A of an electromagnetic relay.

An input voltage dependent on the magnitude of a current to be monitored by the relay circuit arrangement is applied to the input timing circuit, and when the monitored current is of normal value this input voltage is of only small value and the relay coil A is required to remain unenergised. However, this input voltage increases to a higher value when the monitored current rises to a range of excessive values, and in response thereto the circuit arrangement is required to energise the relay coil A after a time delay which is dependent on the actual magnitude of the monitored current.

The coil A is connected on one side thereof to a zero potential terminal of a D.C. supply source, and on the other side thereof to the collector of an output stage germanium transistor T2 of conductivity type p-n-p. The emitter of this transistor is connected to a positive potential terminal of the D.C. supply source, and a capacitor C2 is connected in parallel with the emitter-collector path of this transistor so as to protect the transistor against high transient voltages which may be induced when rapidly changing the magnitude of the direct current which flows in the coil A.

The base of the transistor T2 is connected to the collector of an input stage germanium transistor T1 of opposite conductivity type, i.e., n-p-n, and a resistor TR having a negative temperature coefficient of resistance, hereafter referred to as a thermistor, connects the collector of the transistor T1 with the positive potential terminal of the D.C. supply source.

The emitter of the transistor T1 is connected to an adjustable tapping of a potentiometer P which is in turn connected for supply in parallel with a voltage stabilizing zener diode D2. This diode is connected in series with a resistor R2 between the terminals of the D.C. supply source so as to form a source of stabilized potential for the input stage of the amplifier.

The base of the transistor T1 is connected through a germanium diode D1 to a junction of a capacitor C1 and a resistor R1, which components together constitute the input timing circuit to whose terminals an input voltage signal is to be applied. The base-emitter circuit of the transistor T1 is completed by a connection joining the other side of the capacitor C1 with the junction of the zener diode T2 and its associated resistor R2 of the voltage stabilizing circuit.

It will be appreciated that the base-emitter circuit of the input stage of the amplifier includes in series opposition a "drive" potential source constituted by the capacitor C1 and a "bias" potential source constituted by the lower part of the potentiometer P. Thus conduction of the input stage transistor T1 occurs only when the drive potential slightly exceeds the bias potential so that the setting of the potentiometer P1 determines the potential to be developed across the capacitor C1 before the transistor T1 becomes conducting, and hence the time delay in causing the conduction of the transistor T1 and the consequent energisation of the relay coil A on applying a given input potential to the input circuit terminals.

When the input stage transistor T1 is in its non-conducting state the base and emitter of the output stage transistor T2 are at substantially the same potential, so that this transistor T2 is maintained in a non-conducting state and the relay coil A unenergised. When the transistor T1 becomes conducting its collector potential falls thus reducing the potential of the base of the output stage transistor T2 relative to that of its emitter, so that the transistor T2 becomes conductive and the relay coil A becomes energised.

The provision of the voltage stabilising circuit D2—R2 renders consistent the time delay in energising the relay coil A after a given input voltage has been applied to the input timing circuit R1—C1.

Since the leakage currents in the transistors T1 and T2 are of the same order as the normal input current to the input circuit, and since the leakage currents increase at a rate such as to double themselves for each 9° C. increase in operating temperature, the thermistor TR in the collector circuit of the input stage transistor T1 is arranged to have a suitable negative temperature coefficient of resistance whereby to compensate for such variations in both transistor leakage currents. As a result the resistance of the thermistor TR falls with increase in operating temperature so that the emitter-base signal applied to the output stage transistor T2 likewise falls with increase in temperature, for constant input voltage applied to the circuit arrangement, so as to compensate for temperature variations in the second transistor T2. It should be noted that since the transistors T1 and T2 are of opposite conductivity types the base current of transistor T2 flows in the collector-emitter path of transistor T1, rather than in the thermistor TR, so that the compensating action of the thermistor is not adversely influenced by variations in base current of the second transistor T2 resulting from changes in operating temperature.

The diode D1 protects the input stage transistor T1 against high inverse voltages such as may appear across the emitter and base of this transistor when the adjustable tapping of the bias potentiometer is set to high positive values whereby to give long time delays in the energisation of the relay coil A. Furthermore, the diode D1 diminishes the flow of collector-base leakage current from the input stage transistor T1 into the input timing circuit. Such a flow of leakage current would otherwise adversely affect the operation of the input timing circuit R1–C1.

It will therefore be appreciated from the above description that by the use of a single thermistor in conjunction with two transistors of opposite conductivity types a simple two stage amplifying apparatus having substantial temperature compensation and being suitable for use with low current input signals may be provided.

What I claim as my invention and desire to secure by Letters Patent is:

1. An electric amplifier comprising first and second electric supply terminals for connection with a source of direct current, a first amplifying circuit which includes a first transistor of one conductivity type and having an emitter, a base and a collector, a resistor having a negative temperature coefficient of resistance, the resistor being connected in series relationship with and adjacent to the collector of the transistor, and an input circuit means connected with the base and emitter of the transistor for applying a voltage signal between the base and emitter, means for connecting the said first amplifying circuit for supply from the first and second supply terminals, the resistor being connected electrically adjacent the first supply terminal, a second amplifying circuit which includes a second transistor of the opposite conductivity type and having an emitter, a base and a collector, first and second output terminals for supplying an electric load device whereby the load device when connected to these terminals is connected electrically in series relationship with and adjacent to the collector of the second transistor, means for connecting the second amplifying circuit for supply from the first and second supply terminals, the emitter of the second transistor being connected electrically adjacent the first supply terminal, and means for applying across the base and emitter of the second transistor the voltage developed across the resistor, the resistor having a resistance-temperature characteristic such as to compensate for variations in the conduction of both of the transistors with variation in the temperature thereof.

2. As an electric relay circuit, an electric amplifier according to claim 1 in which the means for connecting the first amplifying circuit for supply from the supply terminals includes a voltage stabilising means connected for supply to the supply terminals and having an output circuit for supplying a voltage of substantially constant magnitude to the first amplifying circuit; and in which the input circuit means includes an emitter biasing means and a base driving means for applying between the emitter and base of the first transistor an emitter biasing voltage and a base driving voltage in opposition to one another, the emitter biasing means being connected for supply to the output circuit of the stabilising means and being arranged to supply to the emitter of the first transistor an adjustable biasing voltage whereby to control the magnitude of the base driving voltage at which an emitter-base current begins to flow, and the base driving means including an input circuit for supply from an input voltage signal source and comprising in series relationship a capacitor and a resistor, and circuit means for applying the voltage developed across the capacitor to the base of the first transistor.

3. An electric relay circuit according to claim 2 including a diode connected adjacent the base of the first transistor so as to prevent the flow of collector-base current into the capacitor.

References Cited in the file of this patent

UNITED STATES PATENTS

| | | |
|---|---|---|
| 2,892,165 | Lindsay | June 23, 1959 |
| 2,906,926 | Bauer | Sept. 29, 1959 |
| 2,927,268 | Haggai et al. | Mar. 1, 1960 |
| 2,981,898 | St. John | Apr. 25, 1961 |

OTHER REFERENCES

Shea: "Principles of Transistor Circuits," published by John Wiley and Sons, Inc., fifth printing, August 1955, pp. 164, 177.

Stone: "Tube-Transistor 'Carrier Switch,'" Electronics World, October 1959, pp. 64, 65, 146, 147.